(12) United States Patent
Chuang et al.

(10) Patent No.: US 11,013,366 B2
(45) Date of Patent: May 25, 2021

(54) GRILL DEVICE WITH A FUME COLLECTING CHAMBER

(71) Applicant: Tsann Kuen (Zhangzhou) Enterprise Co., Ltd., Fujian (CN)

(72) Inventors: Hsing Chuang, Fujian (CN); Dongmei Chen, Fujian (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 267 days.

(21) Appl. No.: 16/237,828

(22) Filed: Jan. 2, 2019

(65) Prior Publication Data

US 2019/0200803 A1     Jul. 4, 2019

(30) Foreign Application Priority Data

Jan. 4, 2018  (CN) .......................... 201810008945.6
Dec. 10, 2018  (CN) .......................... 201811504482.9

(51) Int. Cl.
  *B01D 27/08*    (2006.01)
  *A47J 36/38*    (2006.01)
  *A47J 37/06*    (2006.01)

(52) U.S. Cl.
  CPC ............ *A47J 36/38* (2013.01); *A47J 37/0611* (2013.01); *A47J 37/0676* (2013.01); *B01D 27/08* (2013.01); *B01D 2201/0407* (2013.01); *B01D 2201/302* (2013.01)

(58) Field of Classification Search
  CPC ...... B01D 2201/302; B01D 2201/0407; B01D 27/08; A47J 36/38; A47J 37/0611; A47J 37/0676

USPC ............. 55/DIG. 36; 99/360, 375, 400, 446; 126/299 D
See application file for complete search history.

(56) References Cited

U.S. PATENT DOCUMENTS 4,034,663 A * 7/1977 Jenn ......................... A47J 36/38
                                                          99/446
4,206,345 A * 6/1980 Maass .................. A47J 37/0611
                                                          219/386

(Continued)

FOREIGN PATENT DOCUMENTS

CN       201079303 Y     7/2008
WO     2011134313 A1    11/2011

OTHER PUBLICATIONS

Search Report issued to European counterpart application No. 19150152.7 by the EPO dated Jun. 12, 2019.

*Primary Examiner* — Minh Chau T Pham
(74) *Attorney, Agent, or Firm* — Burris Law, PLLC

(57) ABSTRACT

A grill device includes a first grill seat and a second grill seat movably connected to the first grill seat such that the second grill seat is movable between a closed position, where the second grill seat overlaps with the first grill seat in an up-and-down direction to define a grill space therebetween for accommodating a food to be grilled, and an opened position. The second grill seat has a fume collecting chamber which is disposed opposite to and in spatial communication with the grill space in the up-and-down direction when the second grill seat is in the closed position so that fumes generated during grilling are dissipated successfully and are spontaneously ventilated and exhausted without the need to provide a power activated impeller, thereby reducing the manufacturing cost and saving energy.

21 Claims, 17 Drawing Sheets

(56) References Cited

U.S. PATENT DOCUMENTS

| | | | | |
|---|---|---|---|---|
| 5,237,914 | A * | 8/1993 | Carstensen | A47J 37/0786 99/400 |
| 5,467,696 | A * | 11/1995 | Everhart | A47J 37/10 99/375 |
| 6,363,842 | B1 * | 4/2002 | Lin | A47J 36/38 126/299 D |
| 9,474,412 | B2 * | 10/2016 | Fung | B01D 46/0036 |
| 2015/0033952 | A1 | 2/2015 | Fung et al. | |
| 2015/0033957 | A1 * | 2/2015 | Fung | A21B 5/023 99/390 |
| 2015/0312964 | A1 * | 10/2015 | Sorenson | A47J 36/321 219/448.13 |
| 2017/0119208 | A1 * | 5/2017 | Lin | A47J 37/0611 |

\* cited by examiner

GRILL DEVICE WITH A FUME COLLECTING CHAMBER

CROSS-REFERENCE TO RELATED APPLICATION

This application claims priority of Chinese Patent Application No. 201810008945.6, filed on Jan. 4, 2018, and priority of Chinese Patent Application No. 201811504482.9, filed on Dec. 10, 2018.

FIELD

The disclosure relates to a grill device, and more particularly to a grill device with a fume collecting chamber for permitting exhaust of cooking fumes therefrom.

BACKGROUND

Referring to FIGS. 1 and 2, a conventional grill device includes a first grill seat 11, a second grill seat 12 pivotably connected to the first grill seat 11 at rear ends, and a filter assembly 13 mounted in the first grill seat 11. The second grill seat 12 is movable relative to the first grill seat 11 between an opened position and a closed position. In the closed position, the second grill seat 12 overlaps with the first grill seat 11 to define a grill space 14 therebetween. The first grill seat 11 has a first housing shell 111 and a first grill plate 112 mounted on the first housing shell 111 and facing the grill space 14. The first housing shell 111 has a front chamber 113 for receiving the first grill plate 112, and a rear chamber 114 communicating with the front chamber 113 through a plurality of fume channels 115 and having a rear exhaust port 116 and a bottom mounting opening 117. The second grill seat 12 has a second housing shell 121 and a second grill plate 122 mounted on the second housing shell 121 and facing the grill space 14 in the closed position. The filter assembly 13 has an impeller 132, a filter member 133 and a porous plate 131 erectly mounted in the rear chamber 114, and a mounting base 134 disposed to close the bottom mounting opening 117. With the rotation of the impeller 132, fumes generated in the grill space 14 are forced to flow rearwardly through the rear chamber 114 and the filter member 133 and be exhausted from the rear exhaust port 116.

However, such structure of the grill device is bulky in a front-and-rear direction, adversely affecting the outer appearance and resulting in inconvenience during storage. Besides, the impeller 132 is needed to forcibly produce the rearward flow of fumes, which results in a relatively high manufacturing cost and power consumption, and renders disassembly and maintenance thereof inconvenient.

SUMMARY

Therefore, an object of the disclosure is to provide a grill device that can alleviate at least one of the drawbacks of the prior art.

According to the disclosure, the grill device includes a first grill seat and a second grill seat movably connected to the first grill seat such that the second grill seat is movable between a closed position, where the second grill seat overlaps with the first grill seat in an up-and-down direction to define a grill space therebetween for accommodating a food to be grilled, and an opened position. The second grill seat has a fume collecting chamber which is disposed opposite to and in spatial communication with the grill space in the up-and-down direction when the second grill seat is in the closed position.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
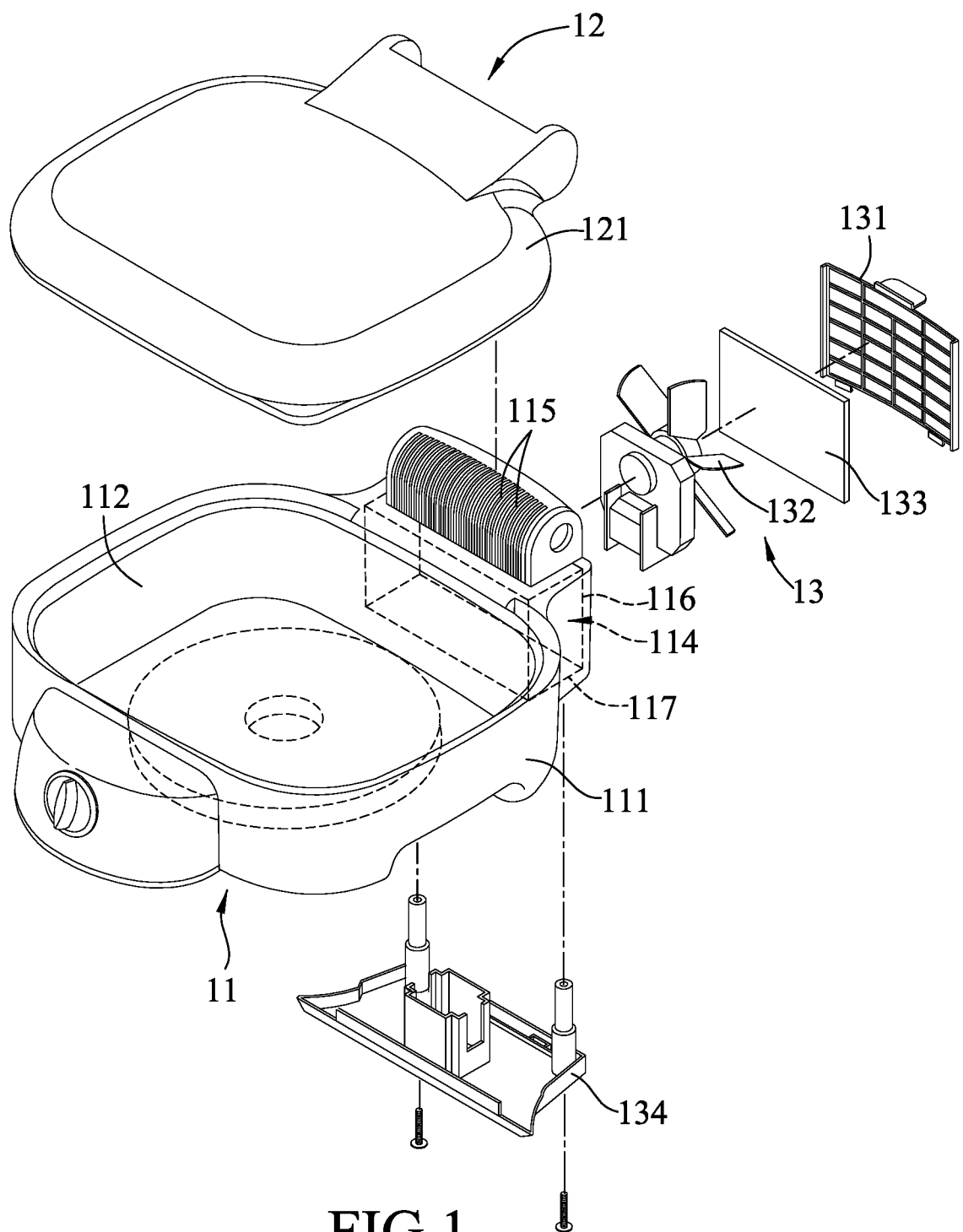
FIG. 1 is an exploded perspective view of a conventional grill device.
Figure 2:
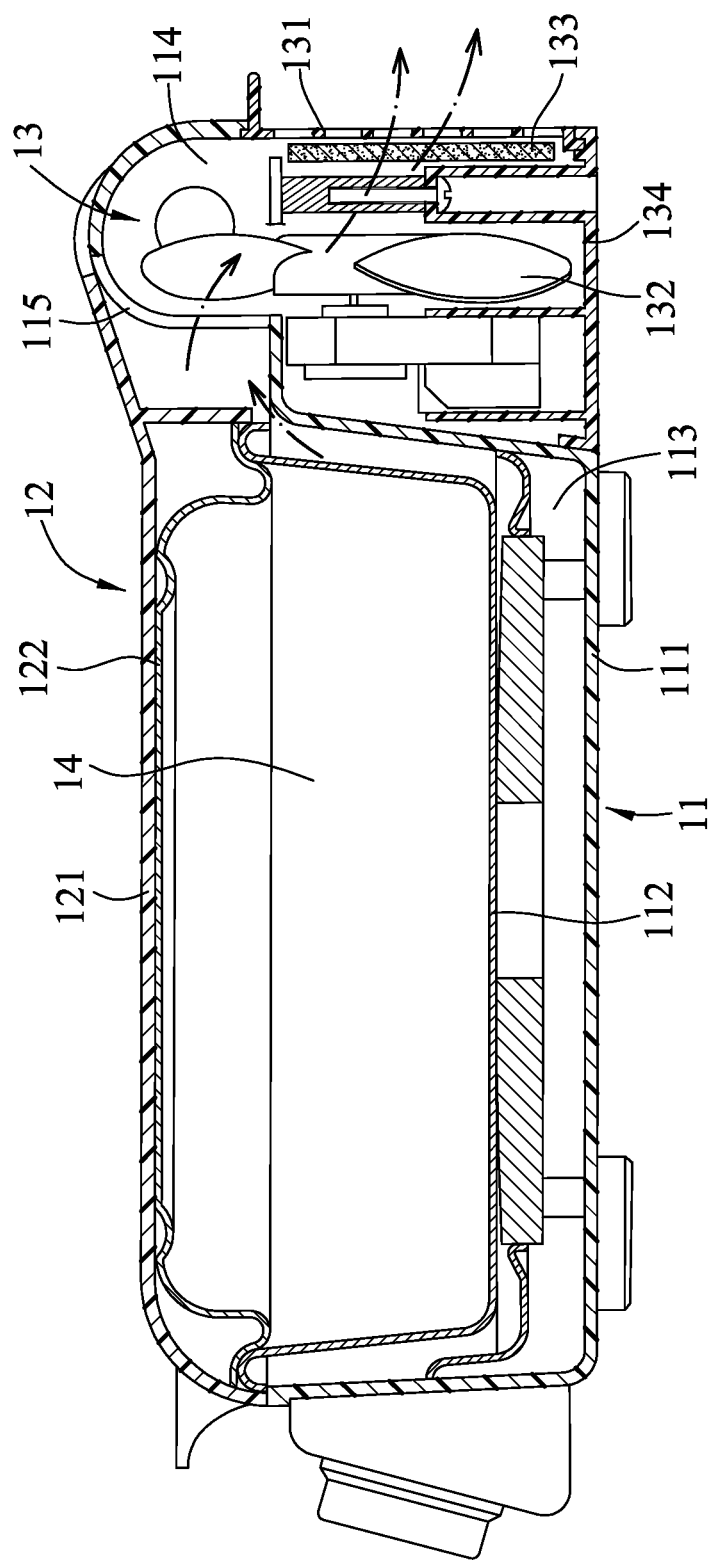
FIG. 2 is a sectional view of the conventional grill device.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
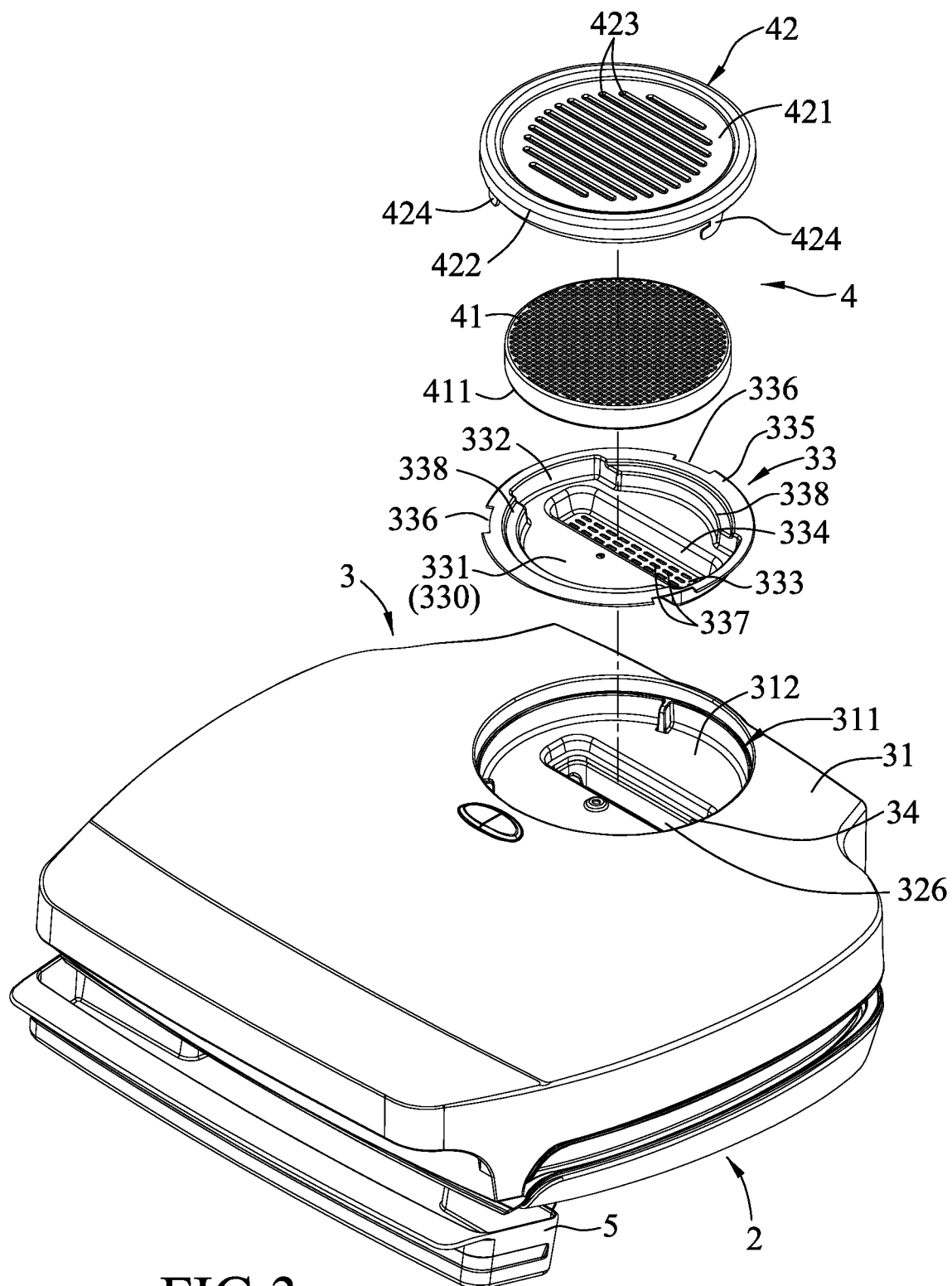
FIG. 3 is a partly exploded perspective view illustrating a first embodiment of a grill device according to the disclosure.
Figure 4:
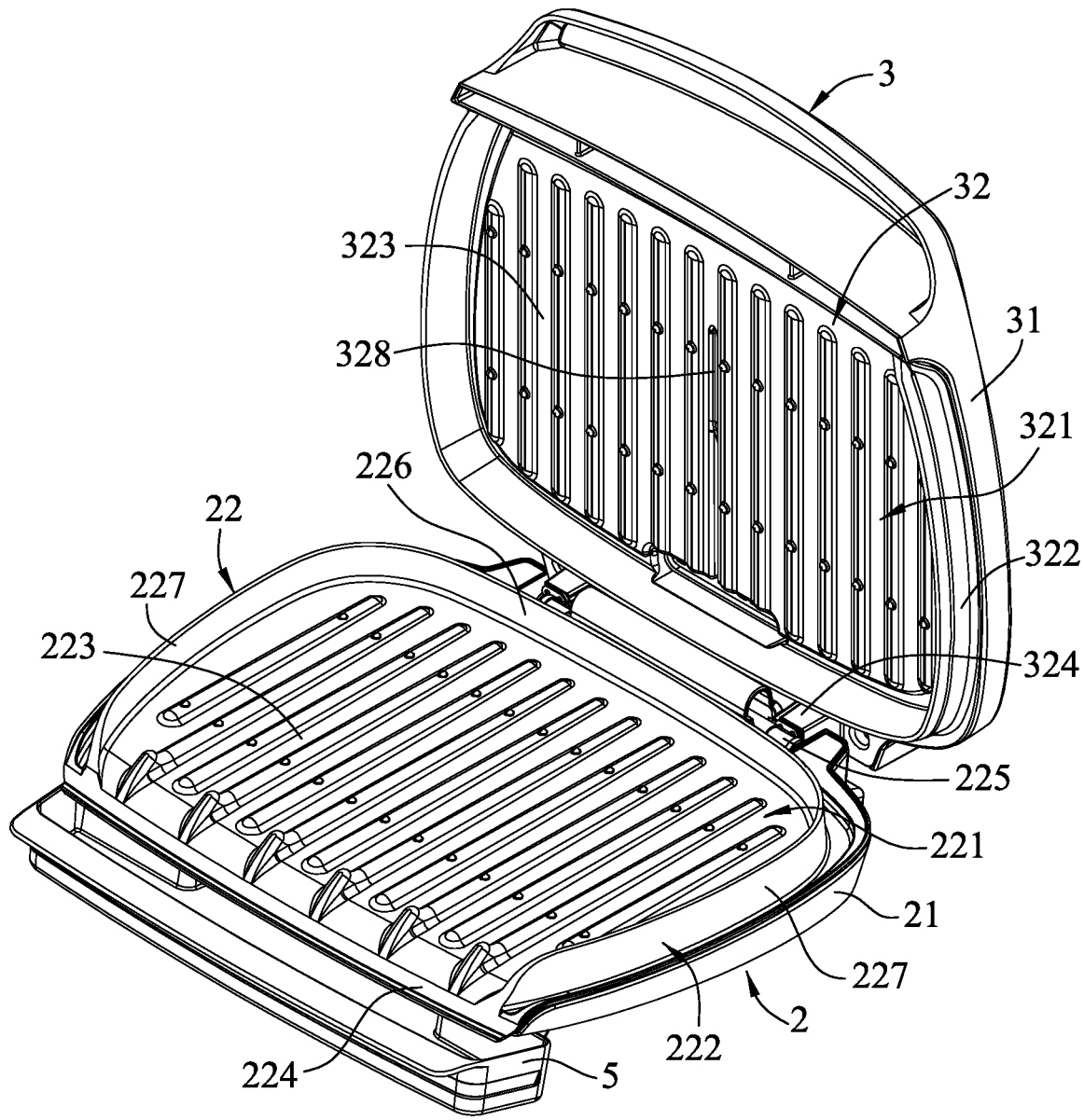
FIG. 4 is a perspective view of the first embodiment in a state where a second grill seat is in an opened position.
Figure 5:
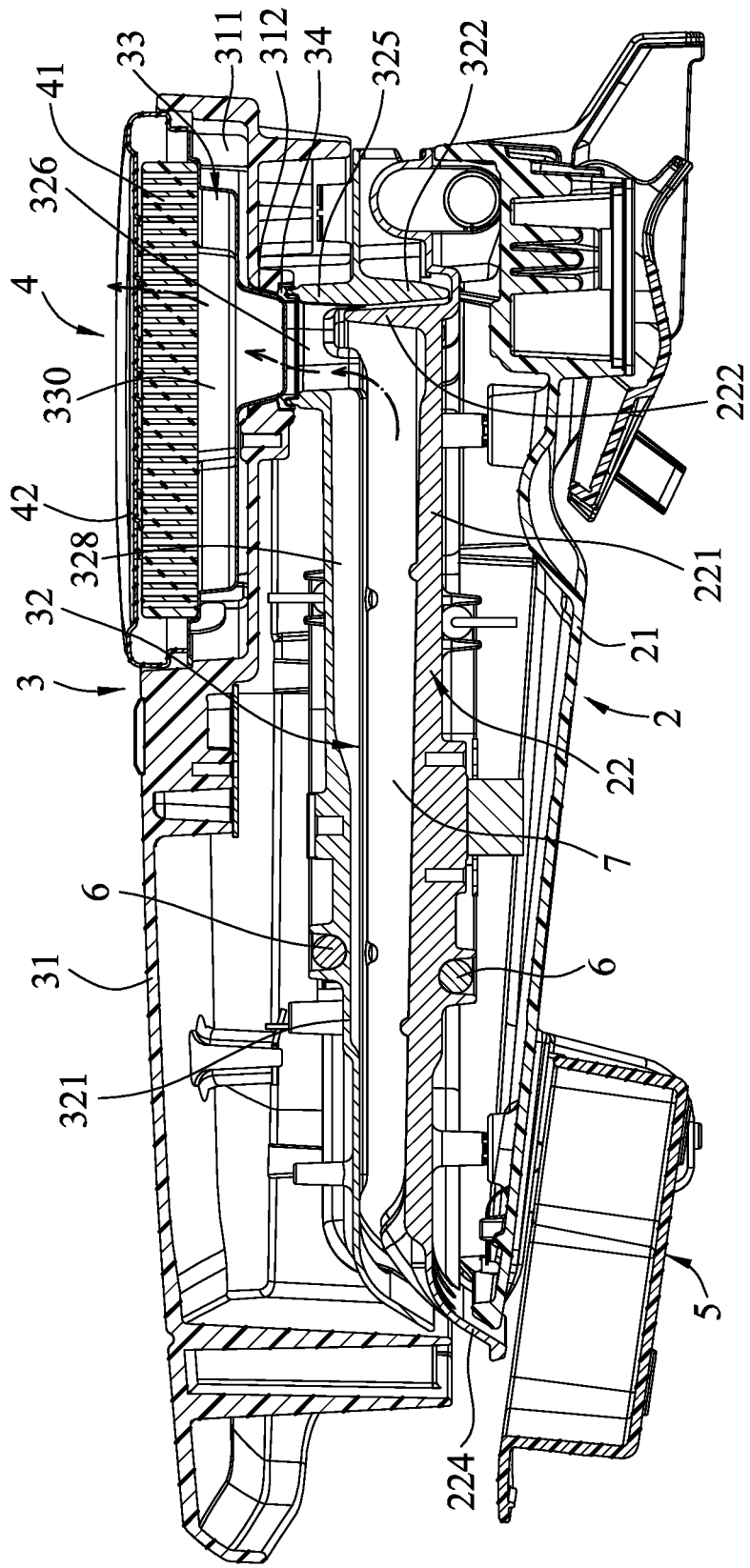
FIG. 5 is a sectional view of the first embodiment in a state where the second grill seat is in a closed position.

Referring to FIGS. 3 to 5, a first embodiment of a grill device according to the disclosure includes a first grill seat 2, a second grill seat 3 pivotably mounted on the first grill seat 2, a filter assembly 4 removably mounted on the second grill seat 3, an oil collecting container 5 disposed below the first grill seat 2, and two heating members 6 respectively mounted in the first and second grill seats 2, 3. The second grill seat 3 is movable relative to the first grill seat 2 between a closed position (see FIGS. 3 and 5), where the second grill seat 3 overlaps with the first grill seat 2 in an up-and-down direction to define a grill space 7 therebetween for accommodating a food to be grilled, and an opened position (see FIG. 4).

The first grill seat 2 has a first housing shell 21 having a first pivot portion 225 at a rear end thereof, and a first grill plate 22 mounted on the first housing shell 21 and made of a heat conductive material. One of the heating members 6 is mounted on an underside of the first grill plate 22 to heat the first grill plate 22. The first grill plate 22 has a first plate wall 221 for placing a food to be grilled, and a U-shaped first surrounding wall 222 which extends from a periphery of the first plate wall 221. The first plate wall 221 has a first heating portion 223 enclosed by the first surrounding wall 222 to be heated by the heating member 6, and an oil dripping portion 224 extends downwardly from the first heating portion 223 and at a front end opposite to the first pivot portion 225. The first surrounding wall 222 has a connecting segment 226 proximate to the first pivot portion 225, and two lateral segments 227 extending forwardly from two sides of the connecting segment 226 to the oil dripping portion 224.

The second grill seat 3 has a second housing shell 31 having a second pivot portion 324 which is pivotably connected to the first pivot portion 225, a second grill plate 32 mounted on and covered by the second housing shell 31, and a fume collecting seat 33 disposed on the second housing shell 31. The second housing shell 31 has a recessed wall 311 defining a mounting space 312. The second grill plate 32 has a second plate wall 321 and a second surrounding wall 322 extending downwardly from a periphery of the second plate wall 321. The second plate wall 321 has a second heating portion 323 enclosed by the second surrounding wall 322 to be heated by the other one of the heating members 6 that is mounted on a topside of the second grill plate 32. A tubular wall 325 extends upwardly from the second plate wall 321 to engage with the recessed wall 311 and defines therein an engaging channel 326 that is in spatial communication with the mounting space 312. The second grill plate 32 has a first fume dissipating conduit 328 which is formed in the second heating portion 323 for facilitating dissipation of fumes generated in the grill space 7 to the engaging channel 326. Furthermore, the second grill seat 3 has a seal ring 34 sandwiched between the tubular wall 325 and the recessed wall 311 to enhance the tight engagement therebetween.

Figure 6:
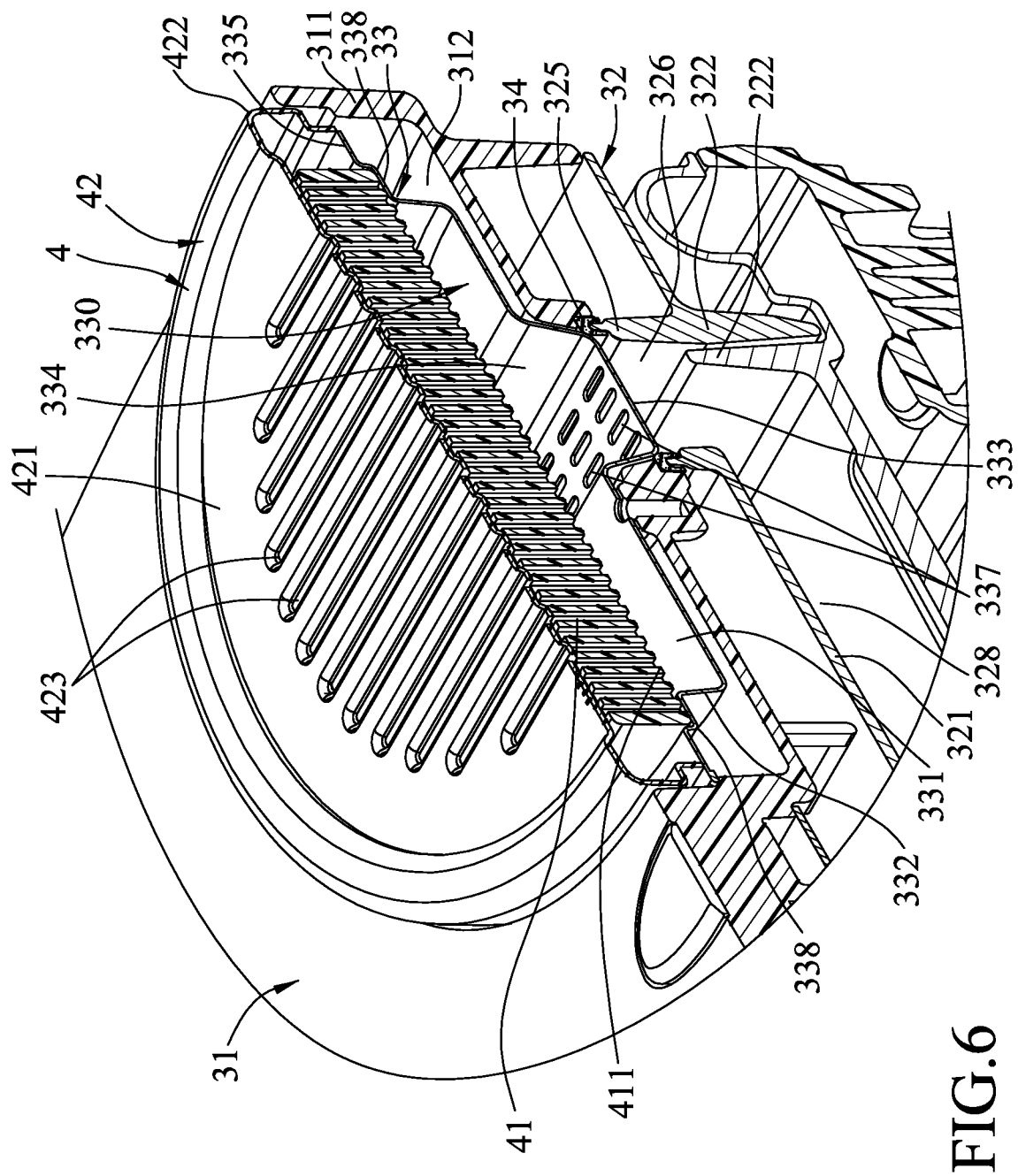
FIG. 6 is a fragmentary, partly-sectioned perspective view of the first embodiment.

With reference to FIGS. 3, 5 and 6, the fume collecting seat 33 may be made as a single piece that is received in the mounting space 312, or formed integrally with the second housing shell 31. The fume collecting seat 33 defines a fume collecting chamber 330, and has a circular bottom wall 331 which has a through bore aligned with the engaging channel 326, a peripheral wall 332 which extends upwardly from a periphery of the bottom wall 331 to cooperatively define the fume collecting chamber 330, a vent forming wall 333 which is disposed parallel to and below the through bore of the bottom wall 331 and has vent holes 337 in spatial communication with the engaging channel 326 and the fume collecting chamber 330, a connecting wall 334 which interconnects the bottom wall 331 and the vent forming wall 333, an upper flange 335 which extends radially and outwardly from an upper end of the peripheral wall 332 and has a plurality of notches 336, and two resting protrusions 338 which extend radially and inwardly from the peripheral wall 332 to the fume collecting chamber 330.

The filter assembly 4 is removably mounted on the fume collecting seat 33, and has a filter member 41 which is mounted in the fume collecting chamber 330 and rested on the resting protrusions 338, and a porous cover 42 which is removably sleeved around the fume collecting seat 33 to cover the filter member 41. The filter member 41 may be an activated carbon with a honeycomb, filter screen or filter cotton structure. In this embodiment, the filter member 41 has a lower major surface 411 which is rested on the resting protrusions 338, and is configured to be fitted to the peripheral wall 332 such that all fumes flow into the fume collecting chamber 330 and through the filter member 41 to be exhausted from the porous cover 42. The porous cover 42 has a porous cover plate 421 having a plurality of exhaust holes 423, an extending wall 422 extending downwardly from a periphery of the cover plate 421, and a plurality of locking snaps 424 disposed on the extending wall 422 and respectively extending through the notches 336 of the fume collecting seat 33 to be turned to retainingly engage with the underside of the upper flange 335.

In use, a food is placed on the first heating portion 223 of the first grill plate 22, and the second grill seat 3 is moved to the closed position, as shown in FIG. 5, where the fume collecting chamber 330 is disposed opposite to and located above the grill space 7 in the up-and-down direction and is in spatial communication with the grill space 7 through the engaging channel 326, and where the first and second surrounding walls 222, 322 are interengaged with each other such that the first and second plate walls 221, 321 face each other and are opposite to each other in the up-and-down direction, and such that the food is heated through the heating members 6. Oil/grease and waste liquid generated during grilling flow downwardly to the oil collecting container 5 through the oil dripping portion 224 of the first grill plate 22. Fumes generated during grilling, by means of spontaneous ventilation, dissipate upwardly and flow through the engaging channel 326 and the vent holes 337, enter the fume collecting chamber 330, are filtered by the filter member 41, and are then exhausted from the exhaust holes 423. That is, with such structural design, the fumes are ventilated and filtered simply based on the aerodynamics principle. The filter member 41 can be removed and replaced by releasing the locking snaps 424 from the fume collecting seat 33.

Figure 7:
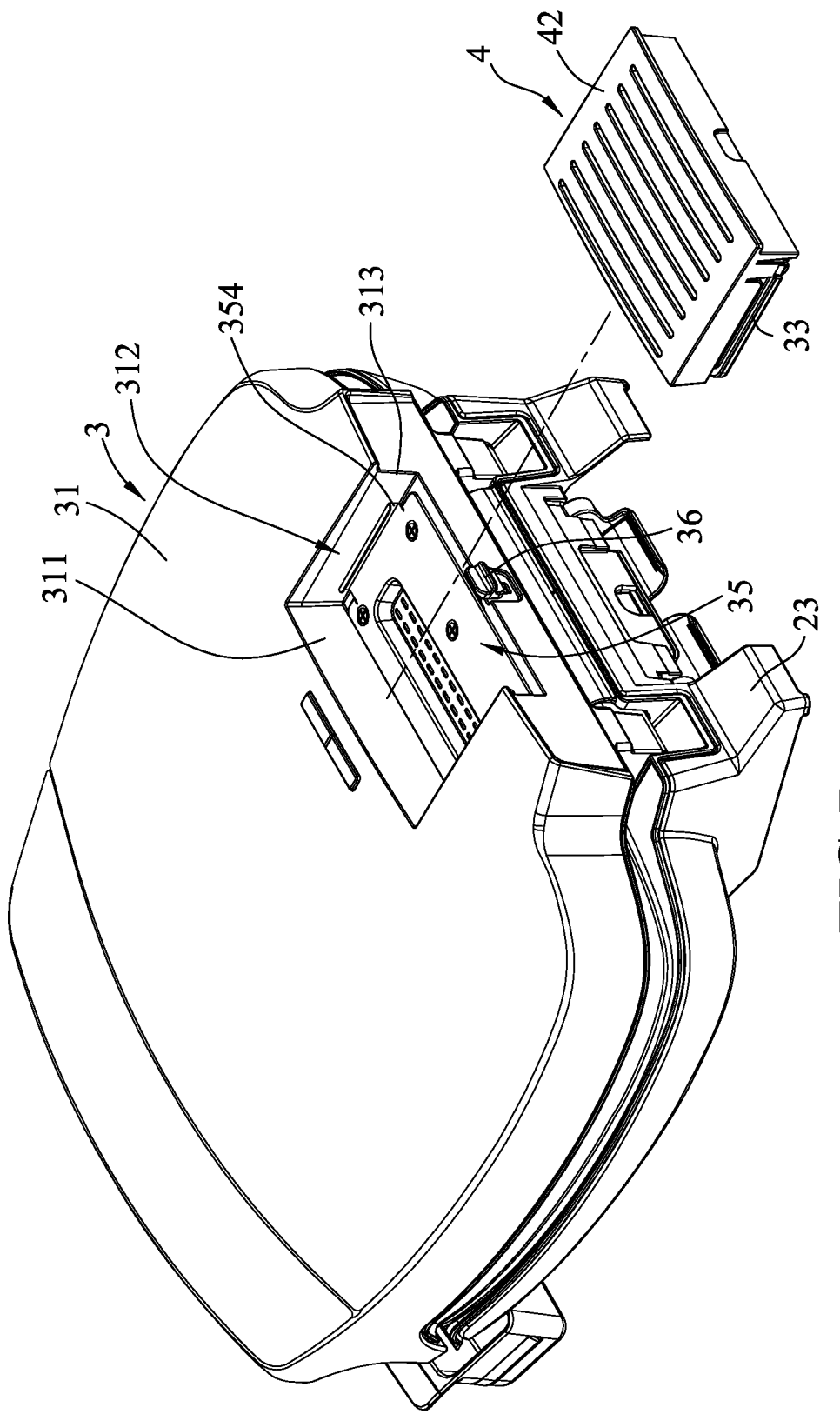
FIG. 7 is a partly exploded perspective view illustrating a second embodiment of the grill device according to the disclosure.
Figure 8:
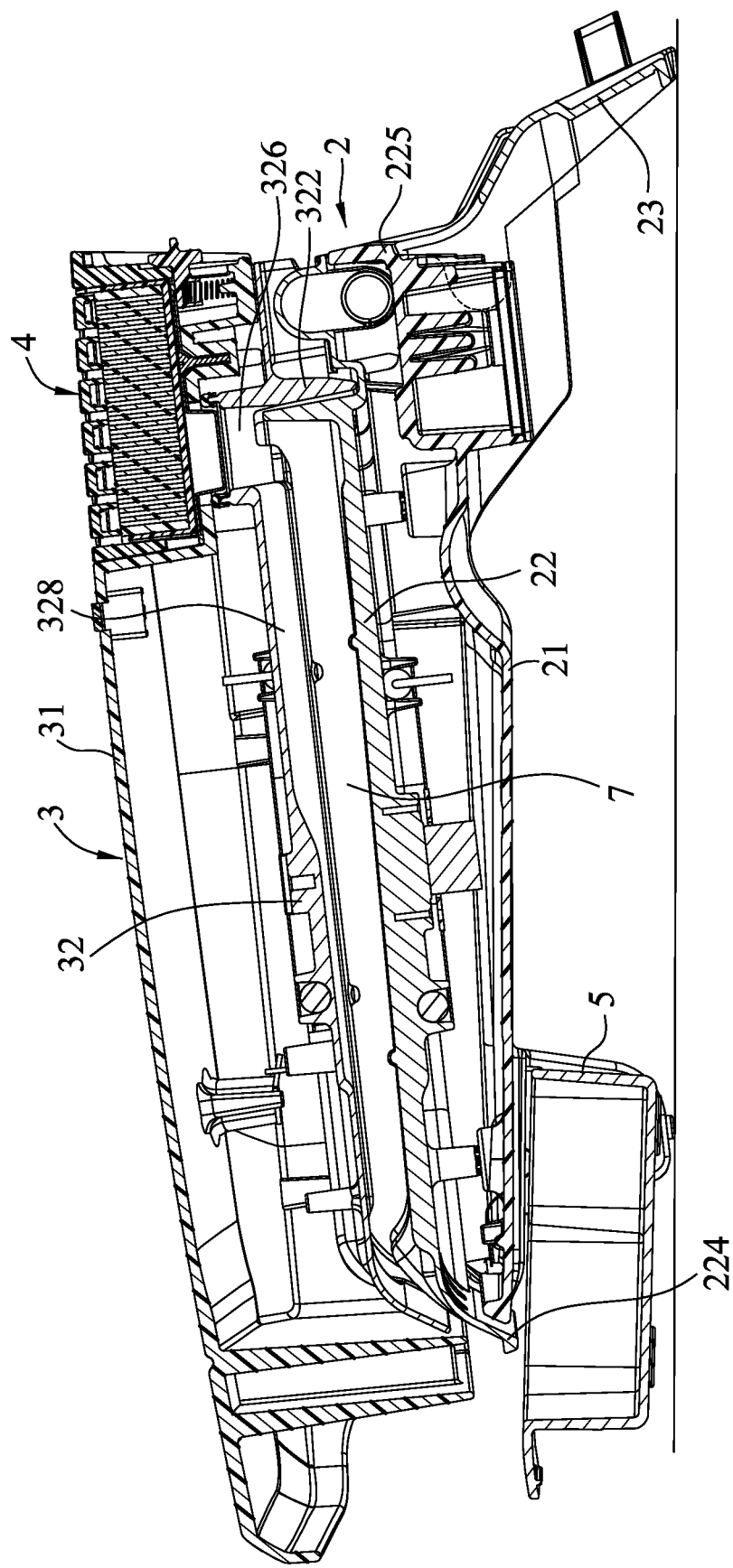
FIG. 8 is a sectional view illustrating a state where a raising member of the second embodiment is in a raising position.
Figure 9:
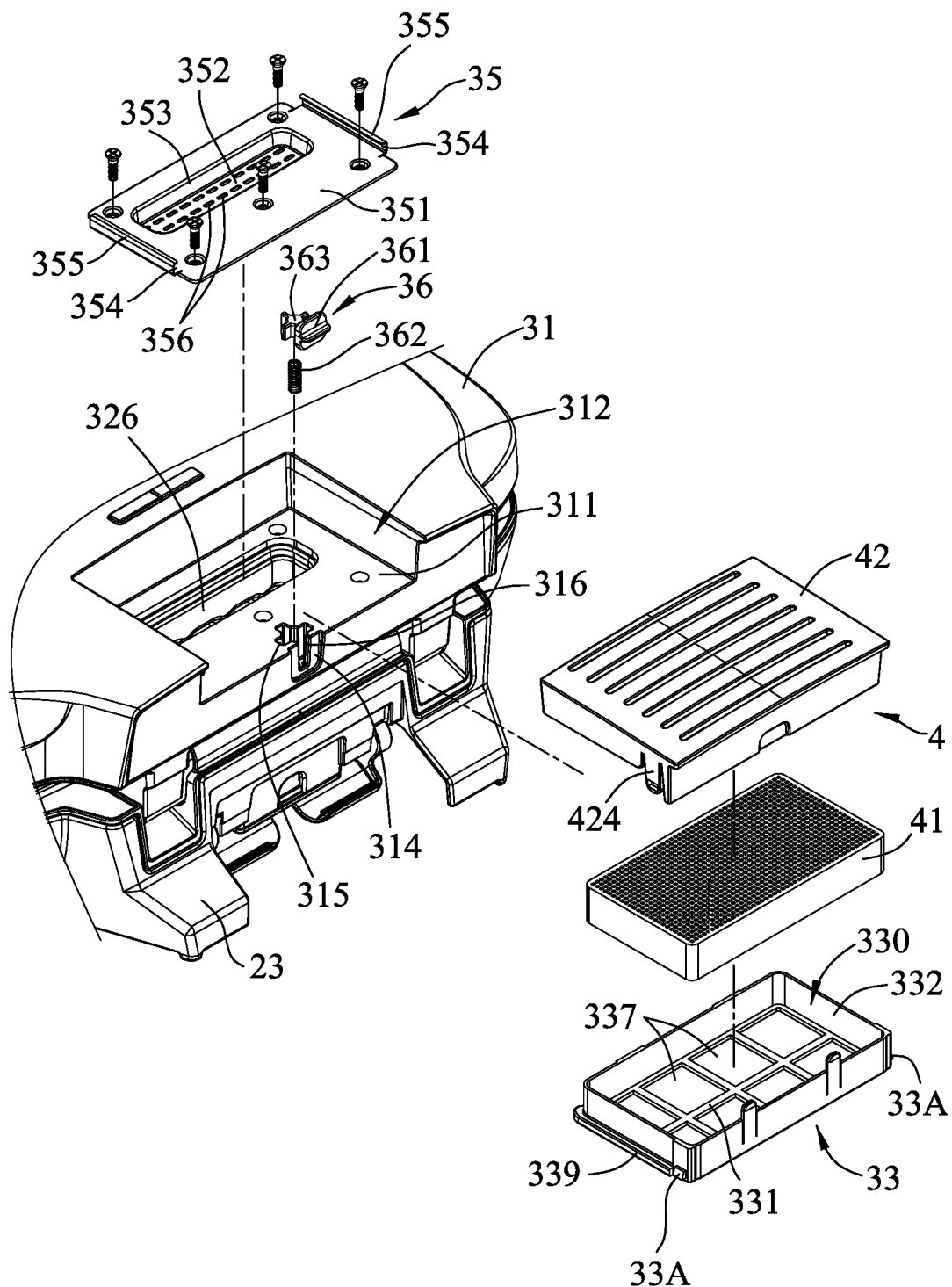
FIG. 9 is a fragmentary, partly exploded perspective view of the second embodiment.

Referring to FIGS. 7 to 9, in a second embodiment, the mounting space 312 of the second housing shell 31 has a rear opened end 313. The recessed wall 311 has a rearwardly facing recess 314, an upwardly opened groove 315 with a T-shaped cross-section, and a communicating slot 316 interconnecting the recess 314 and the groove 315. The first grill seat 2 has a raising member 23 which is collapsibly mounted on the first housing shell 21 and adjacent to the first pivot portion 225 (i.e. opposite to the oil collecting container 5 in a front-and-rear direction) to raise the first housing shell 21 at the first pivot portion 225 (see FIG. 8) for facilitating flowing of oil to the oil collecting container 5.

Figure 10:
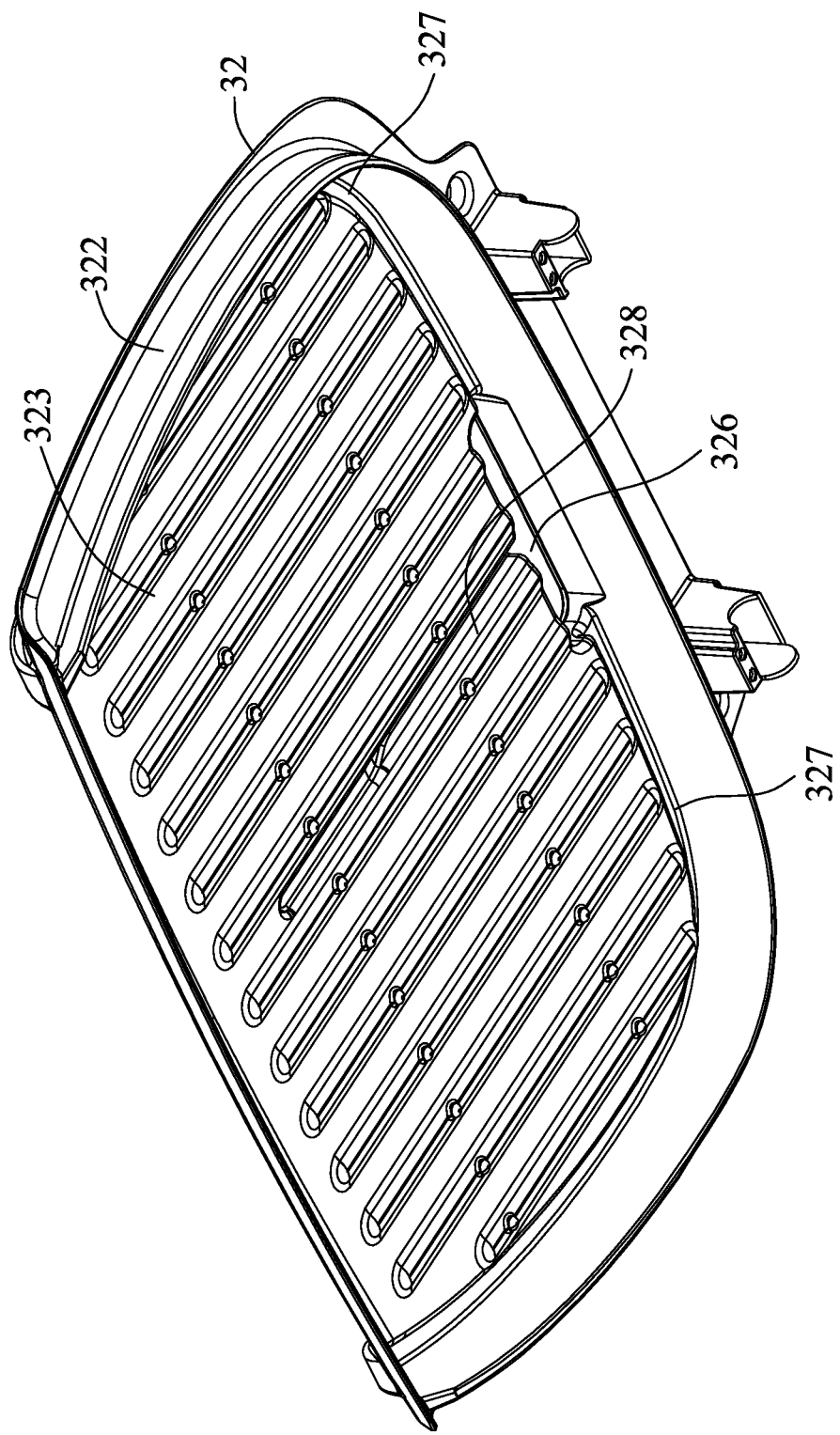
FIG. 10 is a bottom perspective view of a second grill plate of the second embodiment.
Figure 11:
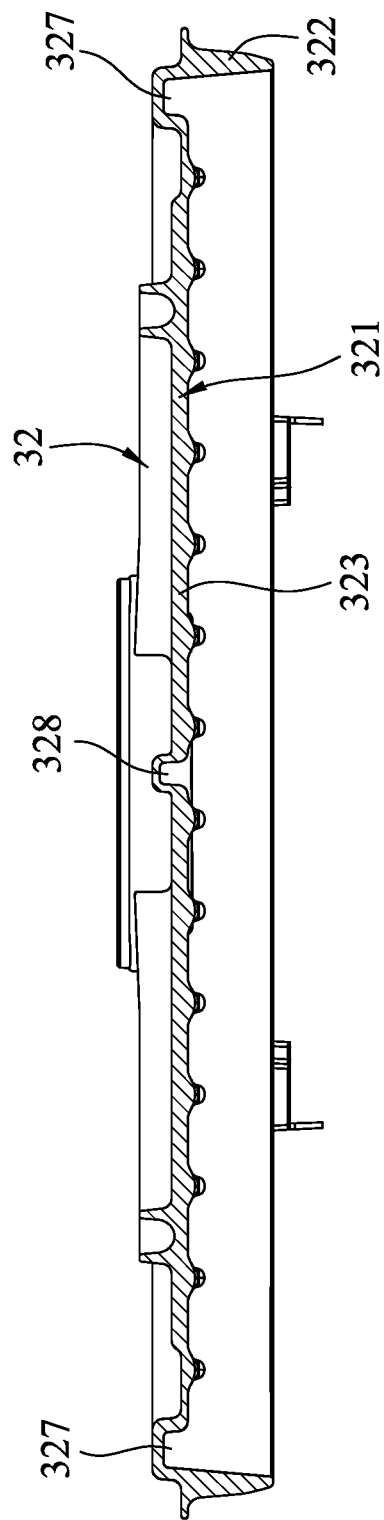
FIG. 11 is a sectional view of the second grill plate of the second embodiment.

With reference to FIGS. 8, 10 and 11, the second grill plate 32 has a first fume dissipating conduit 328 which extends in the front-and-rear direction, and two second fume dissipating conduits 327 which extend along and inwardly of the second surrounding wall 322 and which meet with the engaging channel 326. The first and second fume dissipating conduits 328, 327 project upwardly from an underside of the second heating portion 323 of the second grill plate 32 to facilitate dissipation of fumes generated in the grill space 7 to the fume collecting chamber 330 in the up-and-down direction. When a thick food is placed in the grill space 7, fumes can be dissipated through the fume dissipating conduits 328, 327 to the engaging channel 326.

Figure 12:
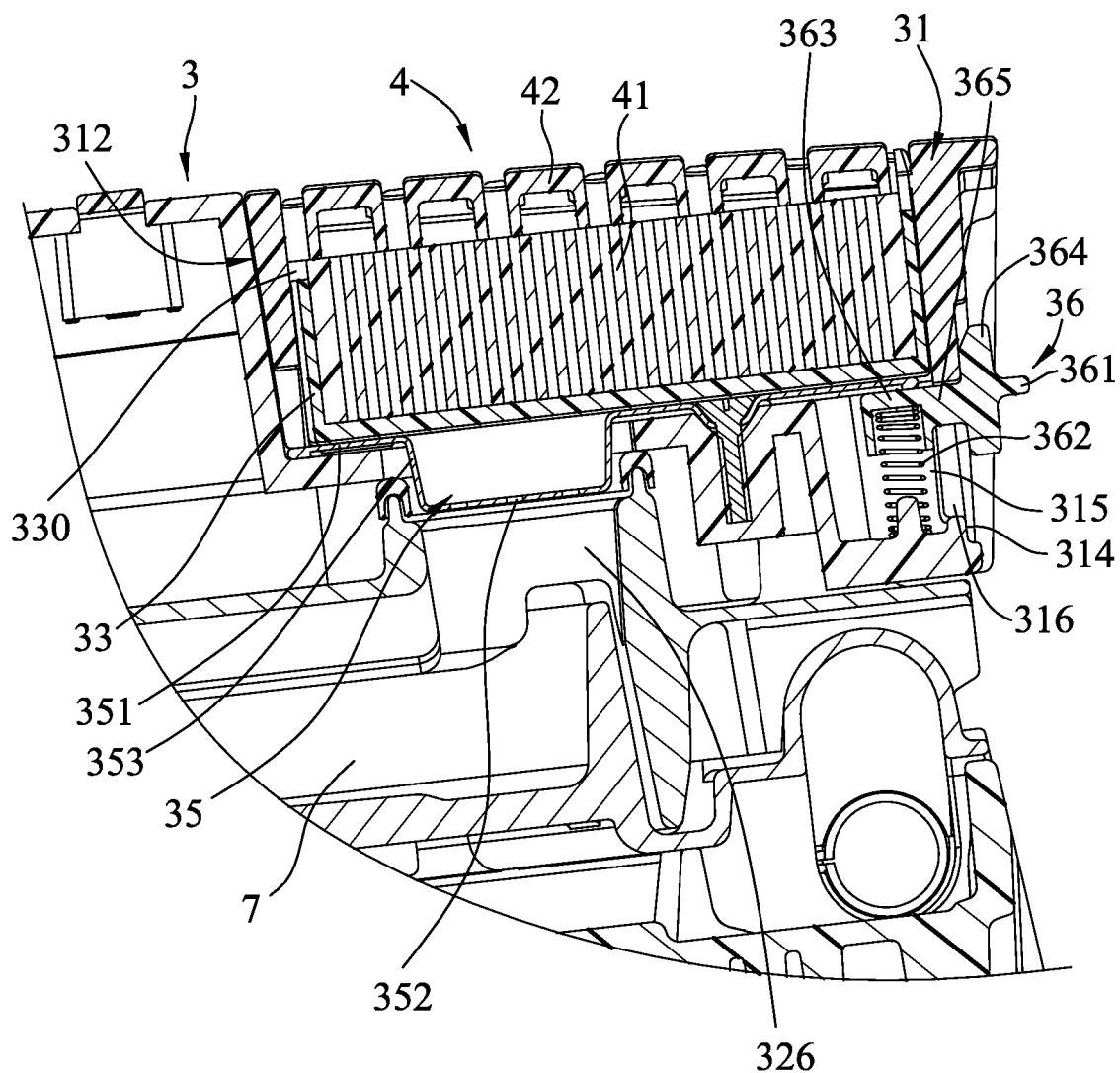
FIG. 12 is a fragmentary sectional view of the second embodiment.

With reference to FIGS. 7, 9 and 12, the second grill seat 3 has a support base 35 mounted in the mounting space 312, and a locking assembly 36. The support base 35 has a major wall 351 which is attached to the second housing shell 31 by means of screws for supporting the fume collecting seat 33 thereon, a generally rectangular vent forming wall 352 which is disposed parallel to and below the major wall 351 and has a plurality of vent holes 356, a connecting wall 353 which interconnects the major wall 351 and the vent forming wall 352, and two groove forming walls 355 which are formed on the major wall 351 and spaced apart from each other in a left-and-right direction to respectively define two sliding grooves 354. The locking assembly 36 has a locking latch 361 and a biasing spring 362. The locking latch 361 has a biased portion 363, a latch portion 364 and a connecting portion 365 respectively received in the groove 315, the recess 314 and the slot 316, and is movable in the up-and-down direction.

The fume collecting seat 33 is removably supported on the support base 35 and between the sliding grooves 354. The fume collecting seat 33 has a porous bottom wall 331, a peripheral wall 332 which extends upwardly from a periphery of the bottom wall 331 to cooperatively define the fume collecting chamber 330, two protrusions 339 which protrude from the peripheral wall 332 to be slidably engaged with the sliding grooves 354 so as to connect the fume collecting seat 33 on the support base 35, and two locking blocks (33A) which are disposed on the peripheral wall 332 and respectively adjacent to the protrusions 339. The bottom wall 331 has a plurality of vent holes 337.

The filter assembly 4 has a filter member 41 received in the fume collecting chamber 330, and a porous cover 42. The porous cover 42 has locking snaps 424 which are disposed to be releasably engaged with the locking blocks (33A), respectively.

In use, the filter member 41 is received in the fume collecting chamber 330, and the locking snaps 424 are engaged with the locking blocks (33A) to secure the filter assembly 4 to the fume collecting seat 33 to form as a unit. The unit is then moved into the mounting space 312 from the rear opened end 313 and through the forward sliding movement of the protrusions 339 along the sliding grooves 354. The locking latch 361 is biased by the biasing spring 362 to a locking position to prevent movement of the unit of the fume collecting seat 33 and the filter assembly 4 from the support base 35.

Figure 13:
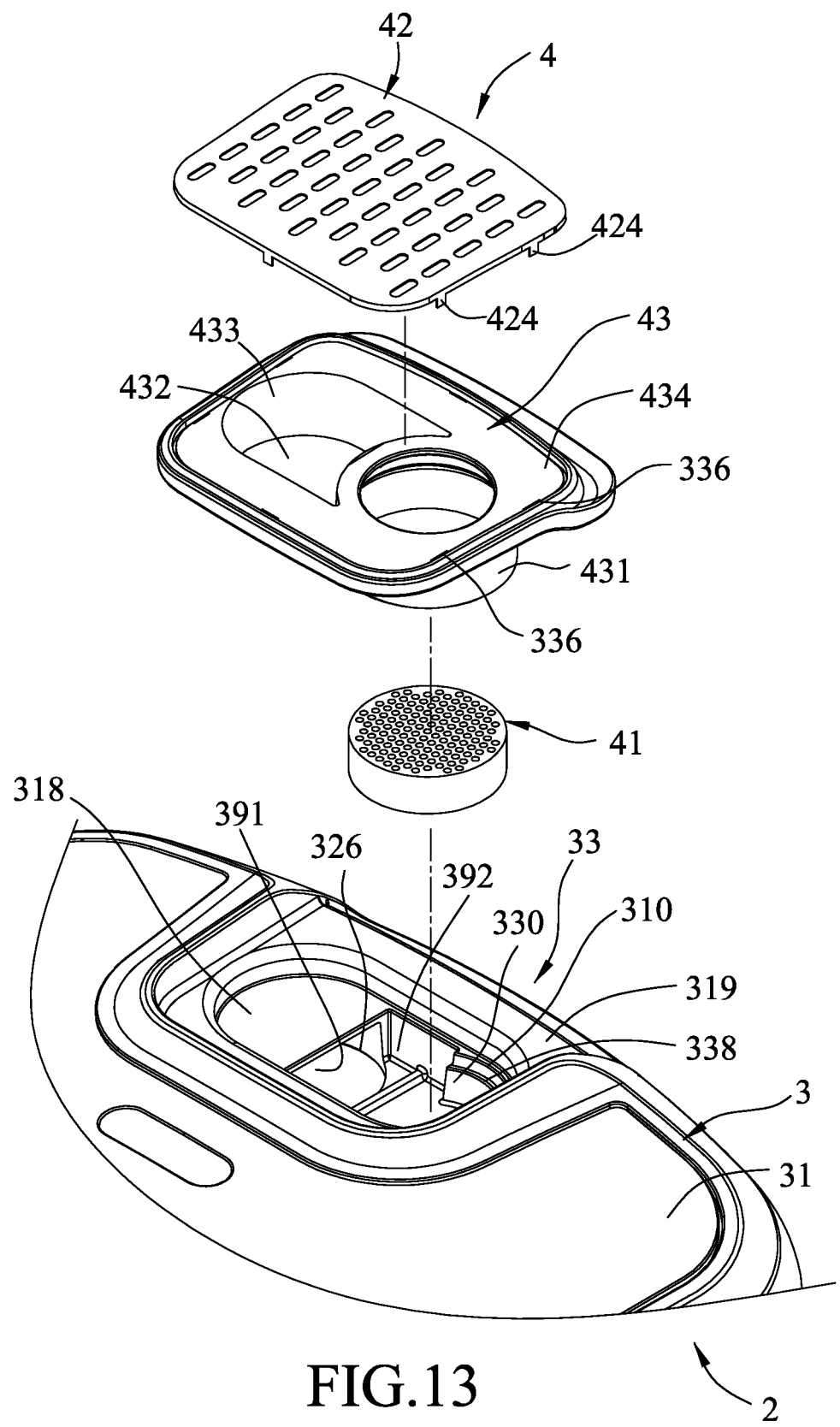
FIG. 13 is a fragmentary exploded perspective view of a third embodiment of the grill device according to the disclosure.
Figure 14:
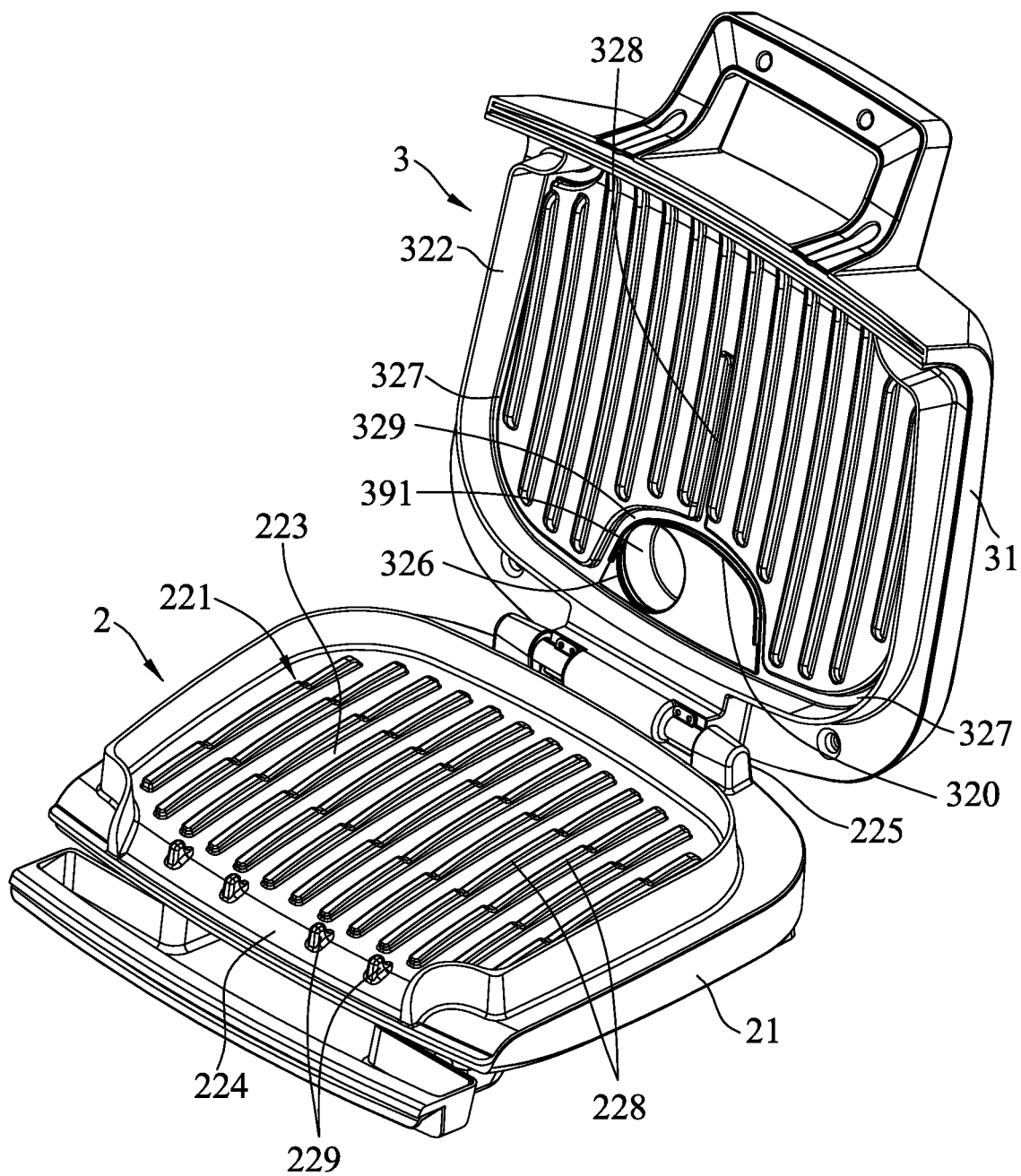
FIG. 14 is a perspective view of the third embodiment in a state where a second grill seat is in an opened position.
Figure 15:
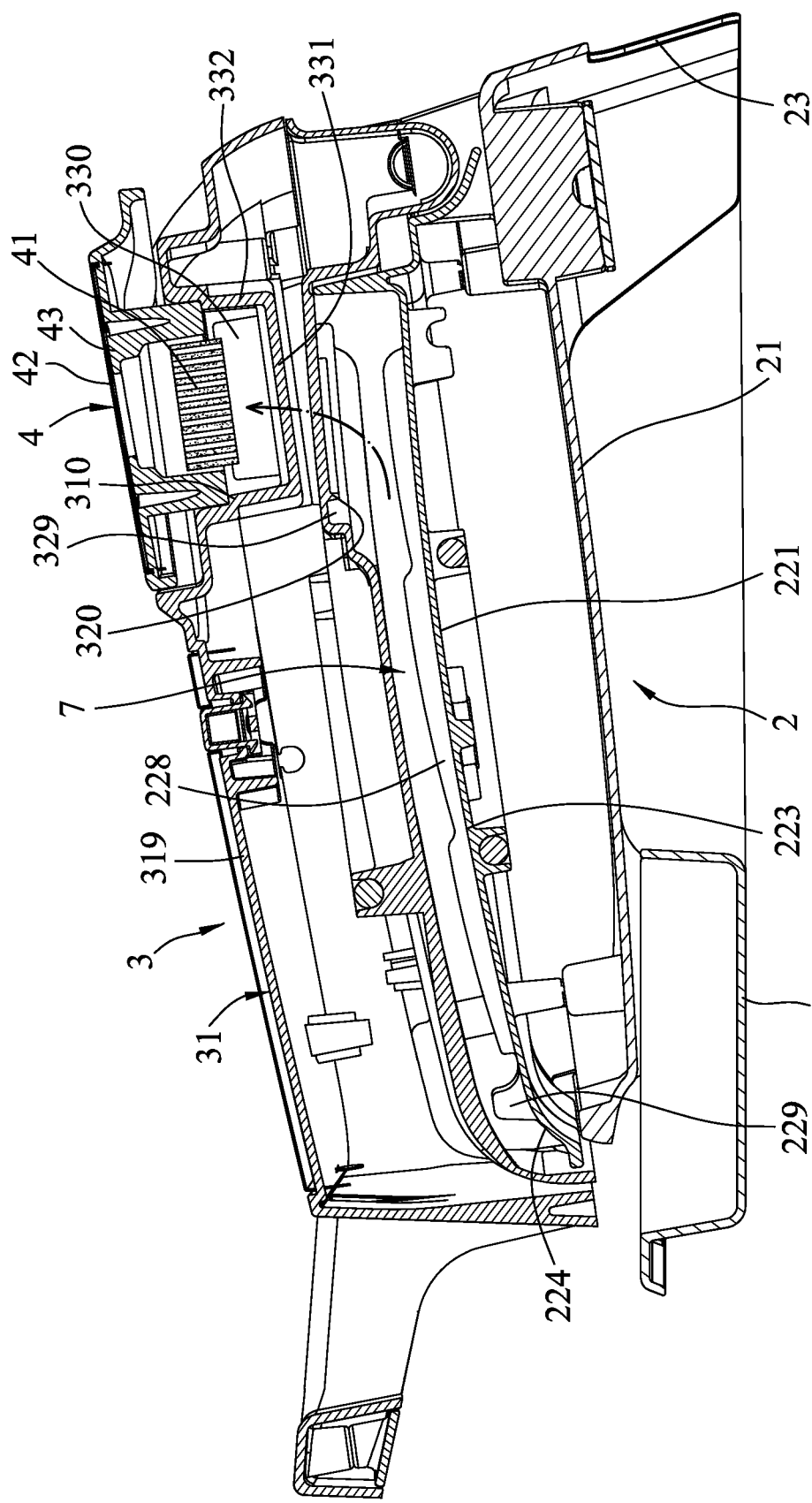
FIG. 15 is a sectional view of the third embodiment in a state where the second grill seat is in a closed position.

Referring to FIGS. 13 to 15, in a third embodiment, the raising member 23 is securely mounted on the first housing shell 21 and adjacent to the first pivot portion 225 to raise the first housing shell 21 at the first pivot portion 225 for facilitating flowing of oil to the oil collecting container 5. The first heating portion 223 of the first plate wall 221 has a plurality of ribs 228 formed thereon and extending in the front-and-rear direction for placing a food thereon, The first plate wall 221 further has a plurality of food holding hooks 229 which project from the oil dripping portion 224 and which are disposed forwardly of the ribs 228 to prevent movement of the food out of the first plate wall 221.

The second grill plate 32 also has two second fume dissipating conduits 327 which extend along and inwardly of the second surrounding wall 322 and which are formed to facilitate dissipation of the fumes generated in the grill space 7 to the engaging channel 326, a fume collecting conduit 329 which extends outwardly of and surrounds the fume collecting chamber 330 to communicate the second fume dissipating conduits 327 with the first fume dissipating conduit 328, and an oil partition wall 320 which extends between the fume collecting conduit 329 and the fume collecting chamber 330 so as to prevent oil from entering the fume collecting chamber 330.

Figure 16:
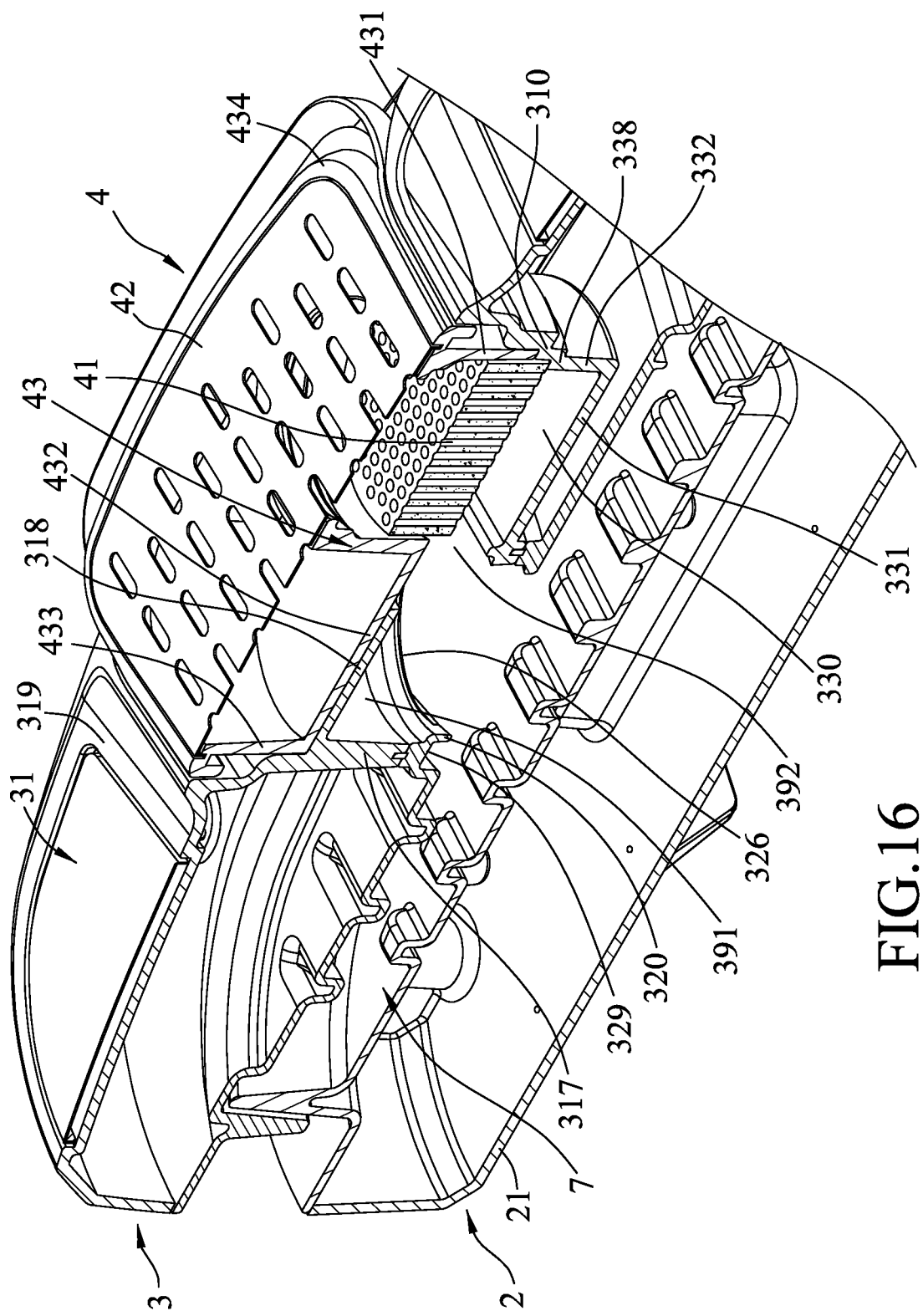
FIG. 16 is a fragmentary, partly-sectioned perspective view of the third embodiment.

With reference to FIGS. 13, 15 and 16, in this embodiment, the fume collecting seat 33 is integrally formed and incorporated with the second housing shell 31 as a single piece, and a communicating channel is formed deflected between the engaging channel 326 and the fume collecting chamber 330. Specifically, the second housing shell 31 has an upright channel 391 which is disposed right above and communicated with the engaging channel 326, and a lateral channel 392 which is disposed laterally of the upright channel 391 to communicate the upright channel 391 with the fume collecting chamber 330. That is, the filter member 41 is offset from the engaging channel 326 in the opening of the second grill plate 32 so as to prevent powdered activated carbon on the filter member 41 and dust from entering the grill space 7.

In the structure, the second housing shell 31 has an upright barrel wall 317 which extends uprightly to define the upright channel 391 therein, a fume conduct wall 318 which extends laterally and inwardly from the upright barrel wall 317 to cover the upright channel 391, a bottom wall 331 which extends transversely from the upright barrel wall 317, a peripheral wall 332 which extends upwardly from a periphery of the bottom wall 331 to cooperatively define the fume collecting chamber 330, and a housing shell wall 319 which extends outwardly from the peripheral wall 332. The lateral channel 392 is defined at a side of the upright barrel wall 317 adjacent to the fume collecting chamber 330 such that the fume collecting chamber 330 is deflected from the engaging channel 326 in the up-and-down direction. The peripheral wall 332 of the second housing shell 31 is in the form of a step-shaped wall, and has at least one first resting protrusion 338 extending inwardly to the fume collecting chamber 330, and at least one second resting protrusion 310 extending inwardly to the fume collecting chamber 330 and flush with the fume conduct wall 318.

The filter assembly 4 has the filter member 41 mounted in the fume collecting chamber 330 and rested on the first rested protrusion 338, a filter positioning seat 43 removably rested on the fume conduct wall 318 and the second rested protrusion 310 and configured to position the filter member 41 in the fume collecting chamber 330, and the porous cover 42 disposed to cover the filter positioning seat 43. Specifically, the filter positioning seat 43 has a sleeve wall 431 which is sleeved around the filter member 41 and which is, at a lower end thereof, rested on the second rested protrusion 310, a rest wall 432 which extends transversely from the lower end of the sleeve wall 431 and which is rested on the fume conduct wall 318, a connecting wall 433 which extends upwardly from the rest wall 432 and which is connected to the sleeve wall 431, and a top wall 434 which extends transversely from upper ends of the sleeve wall 431 and the connecting wall 433 and which is further bent downwardly. The top wall 434 has a plurality of notches 336 spaced apart from each other. The porous cover 42 has a plurality of hooks 424 which are disposed to be engaged in the notches 336, respectively.

In use, fumes generated during grilling, by means of spontaneous ventilation, dissipate upwardly and flow through the engaging channel 326, the upright channel 391 and then the lateral channel 392, enter the fume collecting chamber 330, are filtered by the filter member 41, and are then exhausted from the exhaust holes 423. The filter member 41 can be removed and replaced by detaching the filter positioning seat 43 and the porous cover 42 from the second housing shell 31.

Figure 17:
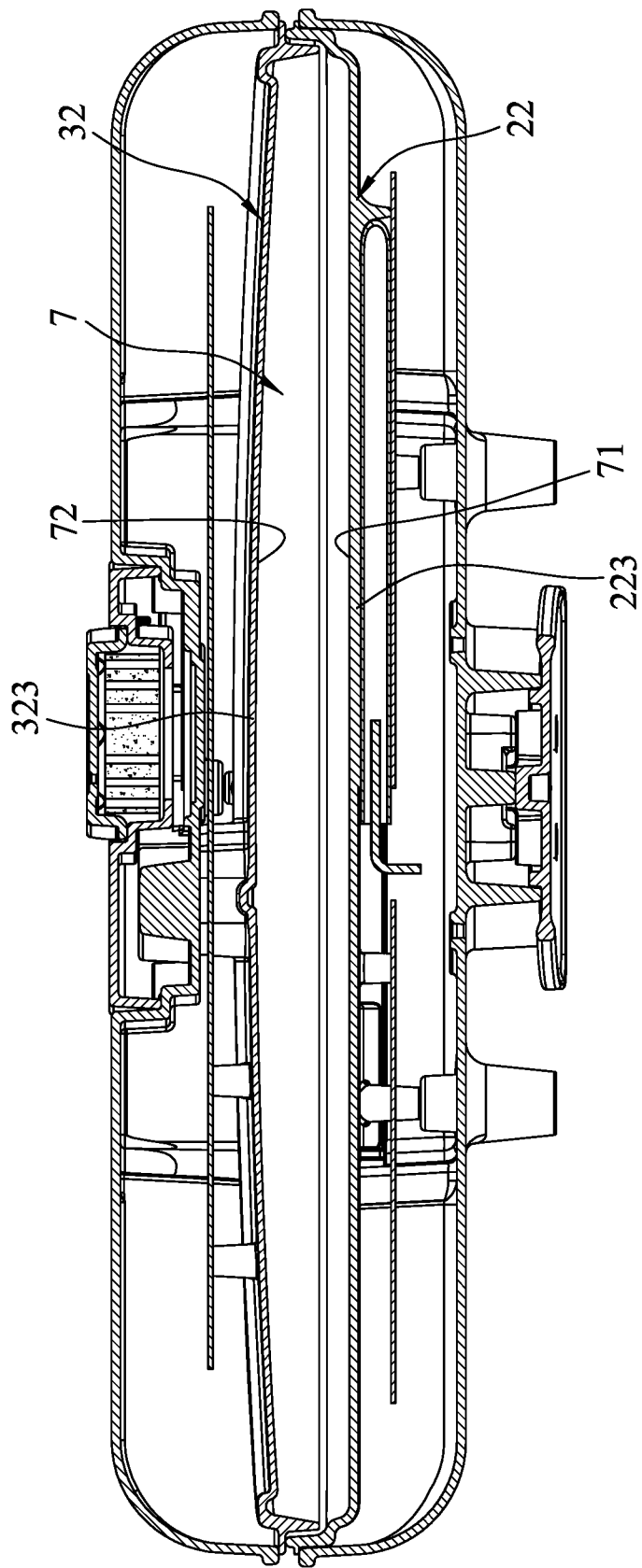
FIG. 17 is a sectional view of a fourth embodiment of the grill device according to the disclosure.

Referring to FIG. 17, in a fourth embodiment, the grill space 7 is defined as an arcuate chamber for facilitating grilling of a food, such as fish. Specifically, the first heating portion 223 of the first plate wall 221 has a first grill surface 71 facing the grill space 7. The second heating portion 323 of the second plate wall 321 has a second grill surface 72 facing the grill space 7. The second grill surface 72 is configured curved toward the first grill plate 22 from a center to left and right sides thereof. Alternatively, the first grill surface 71 is configured curved toward the second grill plate 32 from a center to left and right sides thereof. Additionally, the first and second grill surfaces 71, 72 may be undulating in shape to provide an evenly heating and grill effect.

As illustrated, with the fume collecting seat 33 and the filter assembly 4 disposed above the second housing shell 31, and located above the grill space 7 when the second grill seat 3 is in the closed position (i.e. in the position of use), the fumes generated during grilling are dissipated successfully to the fume collecting chamber 330 to be filtered by and exhausted from the filter assembly 4. Also, such structure is compact to facilitate storage of the grill device and to enhance the aesthetic appeal of the grill device. Moreover, the fumes generated during grilling in the grill space 7 are spontaneously ventilated through the filter member 41 and exhausted without the need to provide an impeller activated by a power, thereby reducing the manufacturing cost and saving energy. Furthermore, in the second embodiment, the filter assembly 4 is removably connected with the fume collecting seat 33 as a unit which is removably mounted in the mounting space 312 of the second grill seat 3, thereby facilitating assembly and disassembly of the filter member 41 for replacement. In the third embodiment, the fume collecting seat 33 is integrally formed and incorporated with the second housing shell 31 as a single piece, such that a separate fume collecting seat can be omitted to simplify the structure of the grill device and to result in convenience during assembly. The fume collecting chamber 330 is deflected from the engaging channel 326 such that entering of powdered activated carbon and dust in the grill space 7 can be prevented.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A grill device comprising:
   a first grill seat; and
   a second grill seat movably connected to said first grill seat such that said second grill seat is movable between a closed position, where said second grill seat overlaps with said first grill seat in an up-and-down direction to define a grill space therebetween for accommodating a food to be grilled, and an opened position, said second grill seat having a fume collecting chamber which is disposed opposite to and in spatial communication with said grill space in the up-and-down direction when said second grill seat is in the closed position, said second grill seat having a second grill plate, said second grill plate having a second plate wall, a second surrounding wall which extends from a periphery of said second plate wall and surrounds said fume collecting chamber, a first fume dissipating conduit which extends in a front-and-rear direction and which is formed to facilitate dissipation of fumes generated in said grill space to said fume collecting chamber in the up-and-down direction, and two second fume dissipating conduits which extend along and inwardly of said second surrounding wall and which are formed to facilitate dissipation of the fumes generated in said grill space to said fume collecting chamber in the up-and-down direction.

2. The grill device as claimed in claim 1, wherein said second grill seat is pivotably mounted on said first grill seat such that said fume collecting chamber is located above said grill space when said second grill seat is in the closed position.

3. The grill device as claimed in claim 1, wherein said second grill plate has a fume collecting conduit extending outwardly of and surrounding said fume collecting chamber to communicate said second fume dissipating conduits with said first fume dissipating conduit, and an oil partition wall extending between said fume collecting conduit and said fume collecting chamber so as to prevent oil from entering said fume collecting chamber.

4. The grill device as claimed in claim 2, wherein said first grill seat has a first grill plate, said first grill plate having a first plate wall for placing a food to be grilled, and a first surrounding wall which extends from a periphery of said first plate wall, said first and second surrounding walls being configured to be interengaged with each other when said second grill seat is in the closed position such that said first and second plate walls face each other and are opposite to each other in the up-and-down direction.

5. The grill device as claimed in claim 4, wherein said first plate wall has a first heating portion enclosed by said first surrounding wall, said second plate wall having a second heating portion enclosed by said second surrounding wall, said grill device further comprising two heating members disposed to heat said first and second heating portions, respectively.

6. The grill device as claimed in claim 5, wherein said first plate wall has an oil dripping portion which extends downwardly from said first heating portion, said grill device further comprising an oil collecting container which is disposed below said oil dripping portion, said first grill seat having a first housing shell on which said first grill plate is mounted, and which has a first pivot portion that is disposed opposite to said oil dripping portion in a front-and-rear direction, and a raising member which is collapsibly mounted on said first housing shell and adjacent to said first pivot portion to raise said first housing shell at said first pivot portion for facilitating flowing of oil to said oil collecting container.

7. The grill device as claimed in claim 5, wherein said first plate wall has an oil dripping portion which extends downwardly from said first heating portion, said grill device further comprising an oil collecting container which is disposed below said oil dripping portion, said first grill seat having a first housing shell on which said first grill plate is mounted, and which has a first pivot portion that is disposed opposite to said oil dripping portion in a front-and-rear direction, and a raising member which is securely mounted on said first housing shell and adjacent to said first pivot portion to raise said first housing shell at said first pivot portion for facilitating flowing of oil to said oil collecting container.

8. The grill device as claimed in claim 5, wherein said first heating portion has a plurality of ribs formed thereon and extending in a front-and-rear direction, said first plate wall having an oil dripping portion which extends downwardly from said first heating portion, and a plurality of food holding hooks which project from said oil dripping portion and which are disposed forwardly of said ribs, said grill device further comprising an oil collecting container which is disposed below said oil dripping portion, said first grill seat having a first housing shell on which said first grill plate is mounted, and which has a first pivot portion that is disposed opposite to said oil dripping portion in the front-and-rear direction, and a raising member which is formed on said first housing shell and adjacent to said first pivot portion to raise said first housing shell at said first pivot portion for facilitating flowing of oil to said oil collecting container.

9. The grill device as claimed in claim 4, wherein said second grill seat has a second housing shell which is disposed to cover said second grill plate, and a fume collecting seat which is disposed on said second housing shell and which has said fume collecting chamber.

10. The grill device as claimed in claim 9, wherein said second grill seat has a support base which is disposed on said second housing shell and configured to permit passage of the fumes generated in said grill space therethrough, said fume collecting seat being removably supported on said support base, said grill device further comprising a filter assembly which is mounted on said fume collecting seat.

11. The grill device as claimed in claim 10, wherein said support base has a major wall which is attached to said second housing shell for supporting said fume collecting seat thereon, a vent forming wall which is disposed parallel to and below said major wall and has at least one vent hole, and two sliding grooves which are formed in said major wall and spaced apart from each other, said fume collecting seat having a porous bottom wall, a peripheral wall which extends upwardly from a periphery of said bottom wall to cooperatively define said fume collecting chamber, and two protrusions which protrude from said peripheral wall to be respectively and slidably engaged with said sliding grooves so as to connect said fume collecting seat on said support base, said filter assembly having a filter member which is mounted in said fume collecting chamber, and a porous cover which is removably sleeved around said fume collecting seat to cover said filter member.

12. The grill device as claimed in claim 11, wherein said second grill seat has a locking assembly which includes a locking latch that is movably mounted on said second housing shell, and a biasing spring that is disposed to bias said locking latch to a locking position to prevent movement of said fume collecting seat from said support base.

13. The grill device as claimed in claim 9, wherein said second housing shell has a mounting space for receiving said fume collecting seat, said second grill plate having an engaging channel which extends upwardly from said second plate wall and spatially interconnects said grill space and said fume collecting chamber when said second grill seat is in the closed position, said fume collecting seat having a bottom wall, a peripheral wall which extends upwardly from a periphery of said bottom wall to cooperatively define said fume collecting chamber, a vent forming wall which is disposed parallel to and below said bottom wall and has at least one vent hole that is in spatial communication with said engaging channel and said fume collecting chamber, and a connecting wall which interconnects said bottom wall and said vent forming wall.

14. The grill device as claimed in claim 13, wherein said fume collecting seat has at least one resting protrusion which extends inwardly from said peripheral wall to said fume collecting chamber, said grill device further comprising a filter assembly, said filter assembly having a filter member which is mounted in said fume collecting chamber and rested on said resting protrusion, and a porous cover which is removably sleeved around said fume collecting seat to cover said filter member.

15. The grill device as claimed in claim 4, further comprising a filter assembly which is mounted on said second grill seat to filter fumes in said fume collecting chamber.

16. The grill device as claimed in claim 15, wherein said second grill plate has an engaging channel which extends upwardly from said second plate wall and spatially interconnects said grill space and said fume collecting chamber when said second grill seat is in the closed position, said second grill seat having a second housing shell which is disposed to cover said second grill plate, said second housing shell having an upright channel which is disposed right above and communicated with said engaging channel, and a lateral channel which is disposed laterally of said upright channel to communicate said upright channel with said fume collecting chamber.

17. The grill device as claimed in claim 16, wherein said second housing shell has an upright barrel wall which extends uprightly to define said upright channel therein, a fume conduct wall which extends laterally and inwardly from said upright barrel wall to cover said upright channel, a bottom wall which extends transversely from said upright barrel wall, a peripheral wall which extends upwardly from a periphery of said bottom wall to cooperatively define said fume collecting chamber, and a housing shell wall which extends outwardly from said peripheral wall, said lateral channel being defined at a side of said upright barrel wall adjacent to said fume collecting chamber such that said fume collecting chamber is deflected from said engaging channel in the up-and-down direction.

18. The grill device as claimed in claim 17, wherein said peripheral wall of said second housing shell has at least one first resting protrusion extending inwardly to said fume collecting chamber, and at least one second resting protrusion extending inwardly to said fume collecting chamber and flush with said fume conduct wall, said filter assembly having a filter member which is mounted in said fume collecting chamber and rested on said first rested protrusion, a filter positioning seat which is rested on said fume conduct wall and said second rested protrusion and which is configured to position said filter member in said fume collecting chamber, and a porous cover which covers said filter positioning seat.

19. The grill device as claimed in claim 18, wherein said filter positioning seat has a sleeve wall which is sleeved around said filter member and which is, at a lower end thereof, rested on said second rested protrusion, a rest wall which extends transversely from said lower end of said sleeve wall and which is rested on said fume conduct wall, a connecting wall which extends upwardly from said rest wall and which is connected to said sleeve wall, and a top wall which extends transversely from upper ends of said sleeve wall and said connecting wall and which is further bent downwardly, said top wall having a plurality of notches spaced apart from each other, said porous cover having a plurality of hooks which are disposed to be engaged in said notches, respectively.

20. The grill device as claimed in claim 5, wherein said grill space is defined as an arcuate chamber.

21. The grill device as claimed in claim 20, wherein said first heating portion of said first plate wall has a first grill surface facing said grill space, said second heating portion of said second plate wall having a second grill surface facing said grill space and curved toward said first grill plate from a center to left and right sides thereof.

\* \* \* \* \*